(12) United States Patent
Takahashi et al.

(10) Patent No.: US 10,734,628 B2
(45) Date of Patent: Aug. 4, 2020

(54) TERMINAL AND WIRING MODULE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Hideo Takahashi, Mie (JP); Shinichi Takase, Mie (JP); Hiroki Shimodo, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 231 days.

(21) Appl. No.: 15/760,652

(22) PCT Filed: Aug. 30, 2016

(86) PCT No.: PCT/JP2016/075277
§ 371 (c)(1),
(2) Date: Mar. 16, 2018

(87) PCT Pub. No.: WO2017/047371
PCT Pub. Date: Mar. 23, 2017

(65) Prior Publication Data
US 2018/0261822 A1 Sep. 13, 2018

(30) Foreign Application Priority Data
Sep. 16, 2015 (JP) .................................. 2015-182728

(51) Int. Cl.
*H01M 2/20* (2006.01)
*H02G 3/16* (2006.01)
(Continued)

(52) U.S. Cl.
CPC ............ *H01M 2/206* (2013.01); *H01B 17/56* (2013.01); *H01G 11/74* (2013.01); *H01G 11/76* (2013.01);
(Continued)

(58) Field of Classification Search
CPC ........ H01M 2/20; H01M 2/206; H01B 17/56; H01G 11/74; H01G 11/76
(Continued)

(56) References Cited

U.S. PATENT DOCUMENTS

| 2003/0219998 | A1 | 11/2003 | Kakuta et al. |
| 2006/0292903 | A1 | 12/2006 | Kanou |
| 2015/0263394 | A1* | 9/2015 | Yoshioka ............ H01M 2/1077 429/90 |

FOREIGN PATENT DOCUMENTS

| JP | 2008-176970 A | 7/2008 |
| JP | 2011-238430 A | 11/2011 |
| JP | 2014-053183 A | 3/2014 |

OTHER PUBLICATIONS

Search Report for PCT/JP2016/075277, dated Oct. 18, 2016.

* cited by examiner

*Primary Examiner* — James M Erwin
(74) *Attorney, Agent, or Firm* — Honigman LLP

(57) ABSTRACT

A bus bar terminal includes an electrode connection portion that connects electrode terminals of power storage elements to each other, and a wire connection portion that is to be connected to an electrical wire. Restriction portions are provided between the electrode connection portion and the wire connection portion, and restrict the movement of a liquid adhered to the electrode connection portion toward the wire connection portion.

3 Claims, 19 Drawing Sheets

(51) Int. Cl.
*H01G 11/76* (2013.01)
*H01G 11/74* (2013.01)
*H01B 17/56* (2006.01)
*H01R 11/09* (2006.01)
*H01R 11/01* (2006.01)
*H01G 11/10* (2013.01)
*H01R 4/18* (2006.01)
*H01R 9/24* (2006.01)
*H01R 4/70* (2006.01)
*H01R 11/12* (2006.01)

(52) U.S. Cl.
CPC ............... *H01M 2/20* (2013.01); *H01R 11/09* (2013.01); *H02G 3/16* (2013.01); *H01G 11/10* (2013.01); *H01M 2220/20* (2013.01); *H01R 4/185* (2013.01); *H01R 4/70* (2013.01); *H01R 9/24* (2013.01); *H01R 11/01* (2013.01); *H01R 11/12* (2013.01)

(58) Field of Classification Search
USPC ........................................................ 429/121
See application file for complete search history.

TERMINAL AND WIRING MODULE

This application is the U.S. national stage of PCT/JP2016/075277 filed Aug. 30, 2016, which claims priority of Japanese Patent Application No. JP 2015-182728 filed Sep. 16, 2015.

TECHNICAL FIELD

The present specification relates to technology regarding terminals.

BACKGROUND

In a power storage module for a vehicle such as an electric automobile or a hybrid vehicle, multiple power storage elements that have electrode terminals are arranged side-by-side, and the power storage elements are connected in series by using bus bars to connect the electrode terminals of adjacent power storage elements to each other. Here, in order to simplify the bus bar attachment operation, there are cases where a wiring module that houses multiple bus bars is attached to the power storage elements.

With this type of wiring module, a voltage detection terminal for detecting the voltage of the power storage elements is placed on a bus bar (see JP 2000-333343A). This voltage detection terminal is connected to a core wire that is exposed from an insulating covering at one end portion of an electrical wire, and the other end portion of the electrical wire is drawn to the outside of the power storage module and connected to an ECU (Electronic Control Unit) or the like.

Incidentally, there are cases where a liquid such as a water drop adheres to a bus bar for connecting electrode terminals. When the temperature of the bus bar decreases while the vehicle is stopped for example, there are cases where condensation forms on the bus bar. There is concern that a problem will occur if the liquid such as the water drop that adheres to the bus bar in this way reaches the electrical wire that is connected to the voltage detection terminal.

The present invention was achieved in light of the above-described situation, and an object of the present invention is to suppress the movement of the liquid adhered to the terminal toward the electrical wire.

SUMMARY

A terminal of the present invention includes: a connection portion that is to be connected to an electrode terminal of a power storage element; and a wire connection portion that is to be connected to an electrical wire, wherein a restriction portion is provided between the connection portion and the wire connection portion, the restriction portion restricting movement of a liquid adhered to the connection portion toward the wire connection portion.

According to this configuration, the movement of the liquid from the connection portion toward the wire connection portion is restricted by the restriction portion, thus making it possible to suppress the movement of the liquid adhered to the connection portion toward the electrical wire.

The following aspects are preferable as aspects for carrying out the present invention.

The connection portion is provided in a plate-shaped portion that is plate-shaped, and the restriction portion extends in a continuous manner from an edge of the plate-shaped portion on one lateral side of the wire connection portion to an edge of the plate-shaped portion on another lateral side.

According to this configuration, the movement of the liquid toward the electrical wire can be efficiently suppressed with a simple configuration.

The connection portion connects a plurality of the electrode terminals to each other.

Another aspect of the present invention may be a wiring module including: the above-described terminal; and an insulating protector that houses the terminal, wherein the insulating protector includes a bottom plate portion that opposes a plate surface of the terminal, and a partition wall that rises from the bottom plate portion and partitions off the terminal, and a discharge hole that discharges the liquid is formed in at least one of the bottom plate portion and the partition wall.

According to this configuration, the liquid, whose movement toward the electrical wire was restricted by the restriction portion, can be discharged to the outside.

Advantageous Effects of Invention

According to the present invention, it is possible to suppress the movement of a liquid adhered to a terminal toward an electrical wire.

DETAILED DESCRIPTION OF PREFERRED EMBODIMENTS

First Embodiment

A first embodiment will be described below with reference to FIGS. 1 to 11.

A wiring module 10 of the present embodiment is for attachment to a power storage module. The power storage module is installed in a vehicle such as an electric automobile or a hybrid automobile, and is used as a power source. In the following description, the X direction is the rightward direction, the Y direction is the forward direction, and the Z direction is the upward direction.

The power storage module includes multiple power storage elements BC (see FIG. 5) that are arranged side-by-side in a horizontal line, and the wiring module 10 is attached to front faces (side faces) of the power storage elements BC. Each power storage element BC has a main body portion that is shaped as a flattened cuboid and houses a power storage element, and includes a bolt-shaped electrode terminal BP that projects from a seat portion PE provided at an end portion of the main body portion. Using a nut (not shown) and the electrode terminal BP as fastening members, a bus bar terminal 20 (one example of a "terminal") is sandwiched between and fastened by the nut and the seat portion PE. Multiple power storage elements BC are connected in series by arranging electrode terminals BP with opposite polarities so as to be adjacent to each other. An electrode terminal BP located at an end of the series connection is connected to a device such as an external inverter via an electrical wire (not shown).

Wiring Module 10

Figure 1:
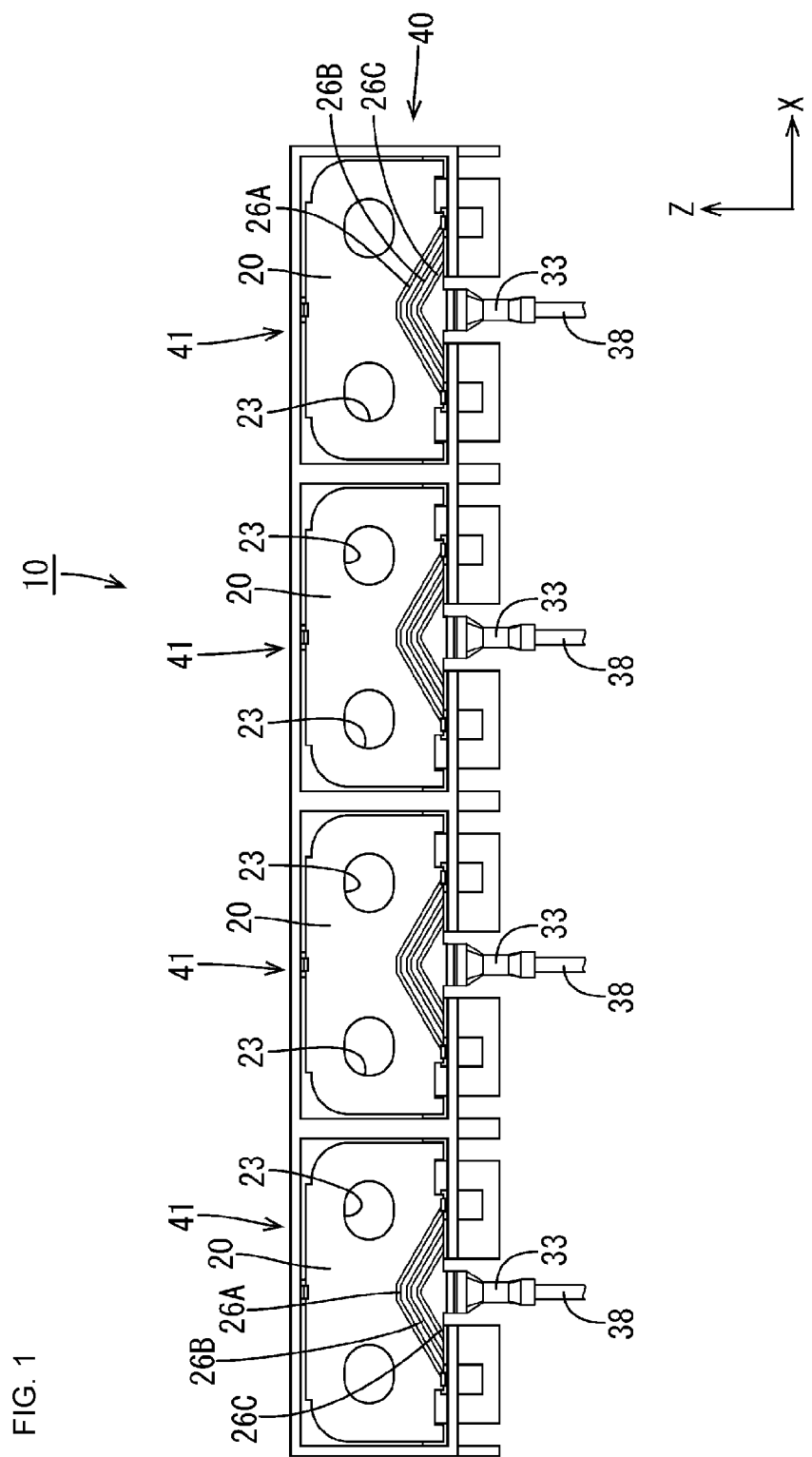
FIG. 1 is a front view of a wiring module of a first embodiment.

As shown in FIG. 1, the wiring module 10 is constituted included multiple bus bar terminals 20 and an insulating protector 40 that houses the bus bar terminals 20.

Bus Bar Terminal 20

Figure 9:
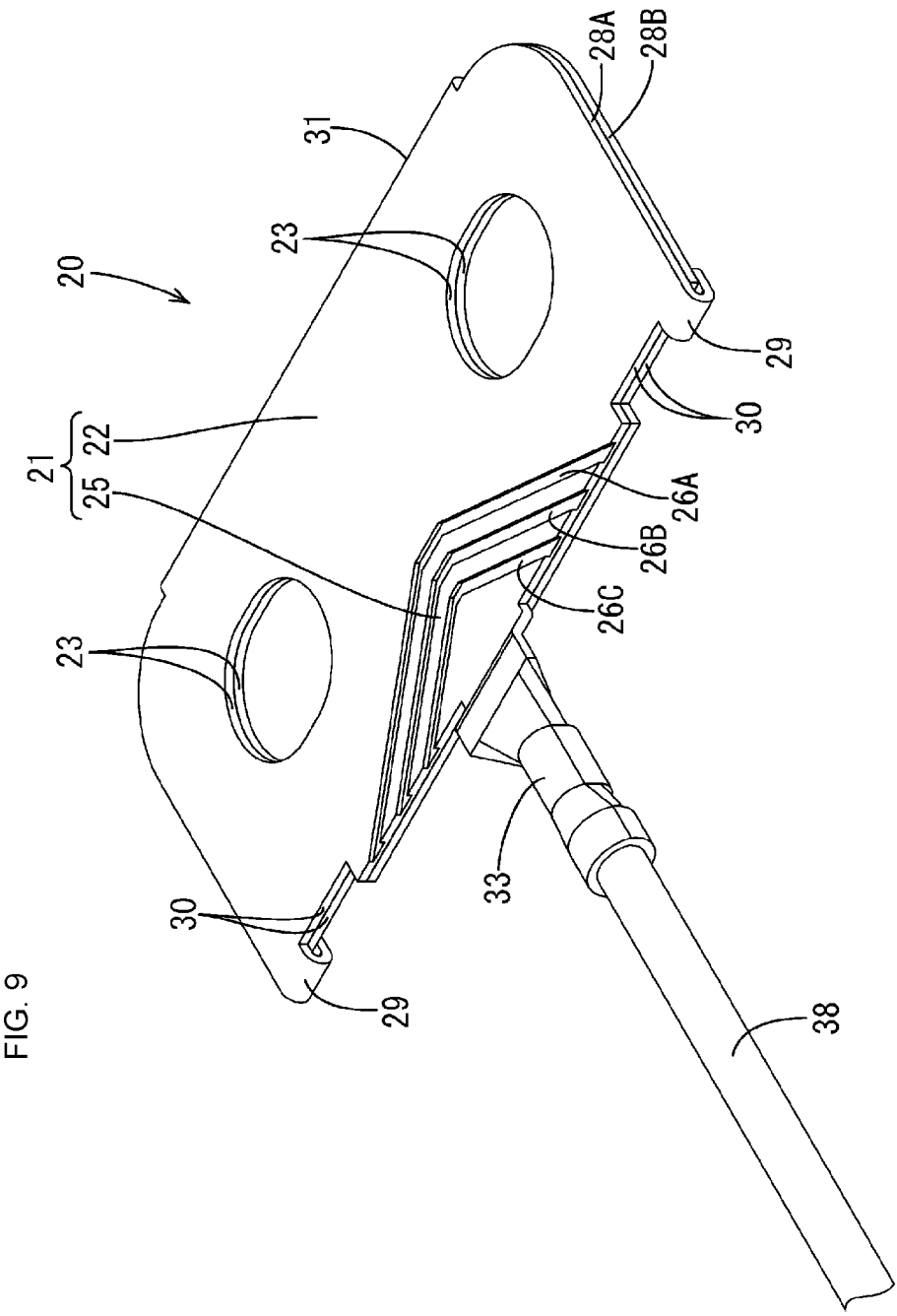
FIG. 9 is a perspective view of a bus bar terminal connected to an end portion of an electrical wire.
Figure 10:
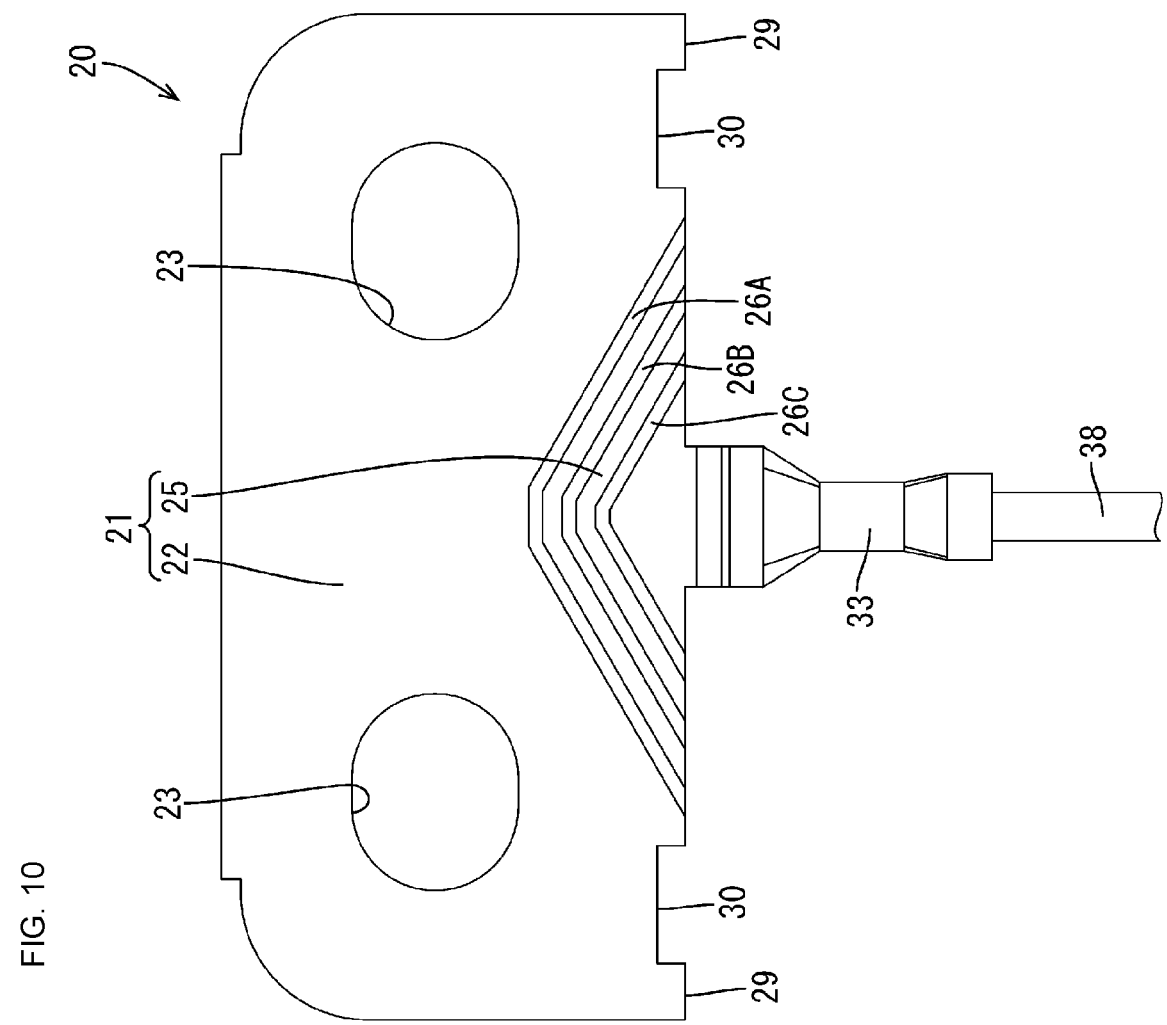
FIG. 10 is a front view of the bus bar terminal connected to the end portion of the electrical wire.

Each bus bar terminal 20 is formed from a metal such as copper, a copper alloy, aluminum, an aluminum alloy, or stainless steel (SUS), and as shown in FIG. 9, includes a plate-shaped portion 21 that is plate-shaped, and a wire connection portion 33 that is formed as a single piece with the plate-shaped portion 21 and is for connection to an end portion of an electrical wire 38.

The plate-shaped portion 21 includes an electrode connection portion 22 (one example of a "connection portion") that has an approximately rectangular shape elongated in the left-right direction and connects adjacent electrode terminals BP to each other, and a joining portion 25 that is continuous between the electrode connection portion 22 and the wire connection portion 33. Recessed portions 30, which are shaped as rectangular cutouts, are formed at positions toward the left and right end portions in the lower end portion of the plate-shaped portion 21.

The plate-shaped portion 21 is formed by stacking a pair of thin flat plate portions 28A and 28B that are shaped as flat plates, and the flat plate portions 28A and 28B are connected by a hinge portion 31. Note that the flat plate portions 28A and 28B are made thin because the wire connection portion 33 is formed as a single piece therewith, thus having a thickness that allows bending for crimping. Two flat plate portions 28A and 28B are stacked in order to reduce electrical resistance by increasing the thickness of the electrode connection portion 22. A pair of holding pieces 29 are provided in corner portions of the flat plate portion 28A, and the flat plate portions 28A and 28B are held in the stacked state by bending the holding pieces 29 so as to be locked to the flat plate portion 28B.

A pair of left and right through-holes 23 are formed in the electrode connection portion 22 in correspondence with the distance between the electrode terminals BP. The through-holes 23 have an elliptical shape elongated in the left-right direction (electrode terminal BP connection direction), and the electrode terminals BP can be inserted through the through-holes 23 with a predetermined clearance in the left-right direction.

Groove-shaped restriction portions 26A to 26C, which restrict the movement of a liquid D adhered to the electrode connection portion 22 toward the wire connection portion 33, are formed in the joining portion 25. The restriction portions 26A to 26C are formed in the front face of the one flat plate portion 28A (the flat plate portion on the front face side) of the plate-shaped portion 21, and three of (multiple) such restriction portions extend in parallel along mountain-shaped paths. In other words, the restriction portions 26A to 26C extend from positions at the lower end edge of the plate-shaped portion 21 on one side and the other side of the wire connection portion 33 toward the intermediate portion in the horizontal direction, in directions that are inclined relative to the lower end edge. The lower ends of the restriction portions 26A to 26C are arranged inward of the recessed portions 30. The restriction portions 26A to 26C each have the same depth, which is a depth approximately half of the thickness of the flat plate portion 28A.

Figure 11:
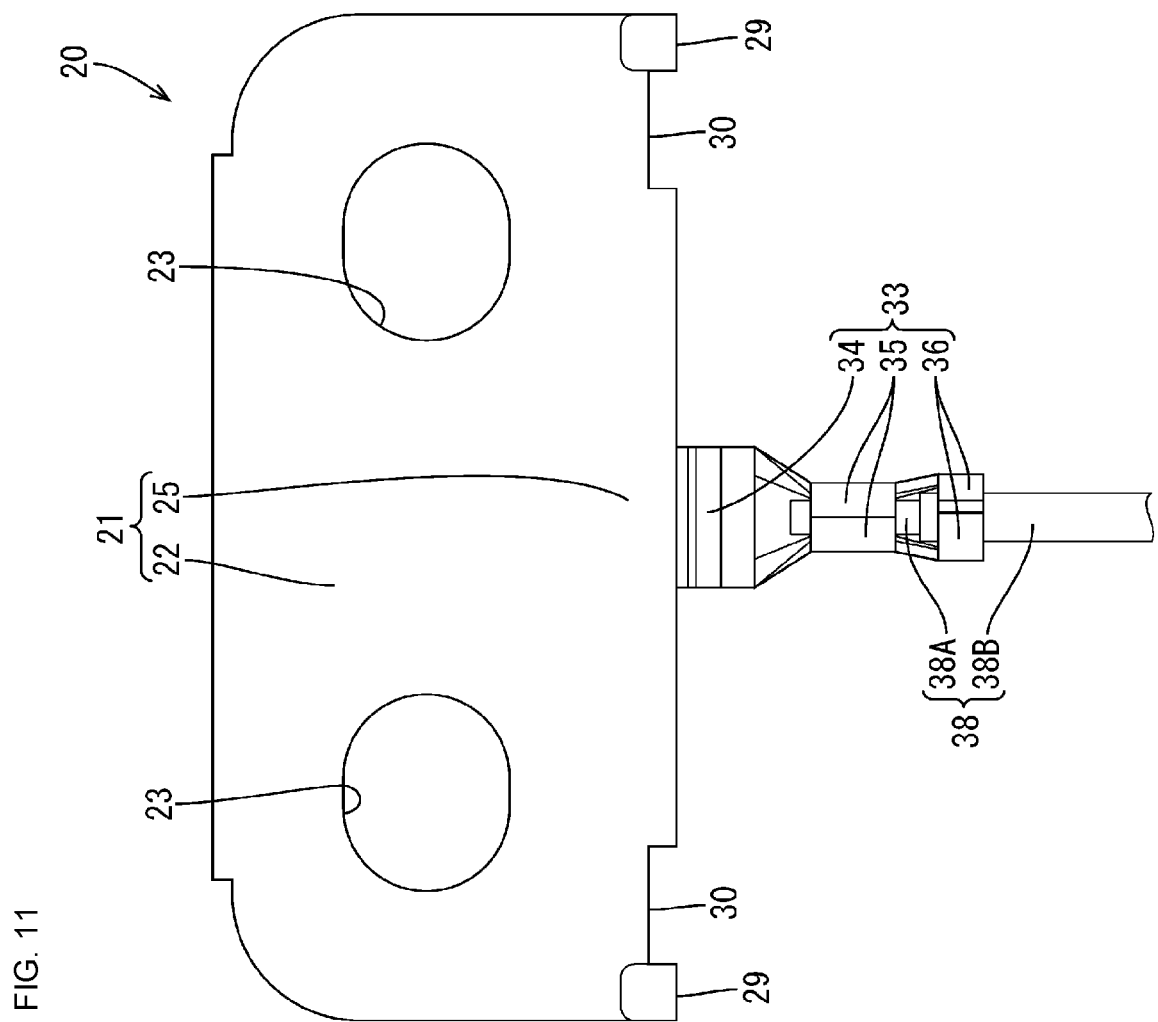
FIG. 11 is a back view of the bus bar terminal connected to the end portion of the electrical wire.

As shown in FIG. 11, the wire connection portion 33 has a terminal connection portion 34 that is integrally connected to the joining portion 25, a wire barrel portion 35 that is continuous with the terminal connection portion 34, and an insulation barrel portion 36 that is integrally continuous with the wire barrel portion 35. The wire barrel portion 35 crimps a conductor portion 38A that is exposed from the electrical wire 38 by removing an insulation covering 38B thereof. The insulation barrel portion 36 holds the electrical wire 38 from above the insulation covering 38B.

The bus bar terminal 20 is obtained by using a pressing machine to perform punching processing on a metal plate member so as to obtain a spread-out shape in which the pair of flat plate portions 28A and 28B are connected by the hinge portion 31, and so as to form the restriction portions 26A to 26C. The hinge portion 31 is then bent, the pair of flat plate portions 28A and 28B are stacked, and the holding pieces 29 projecting from the flat plate portion 28A are bent and locked to the flat plate portion 28B, thus forming the bus bar terminal 20.

The electrical wire 38 that is connected to the wire connection portion 33 is connected to an external ECU (Engine Control Unit) that is not shown. The ECU is provided with a microcomputer, elements, and the like, and has a known configuration including functions for detecting the voltage, current, temperature, and the like of the power storage elements BC, performing charge/discharge control of the power storage elements BC, and the like.

Insulating Protector 40

Figure 3:
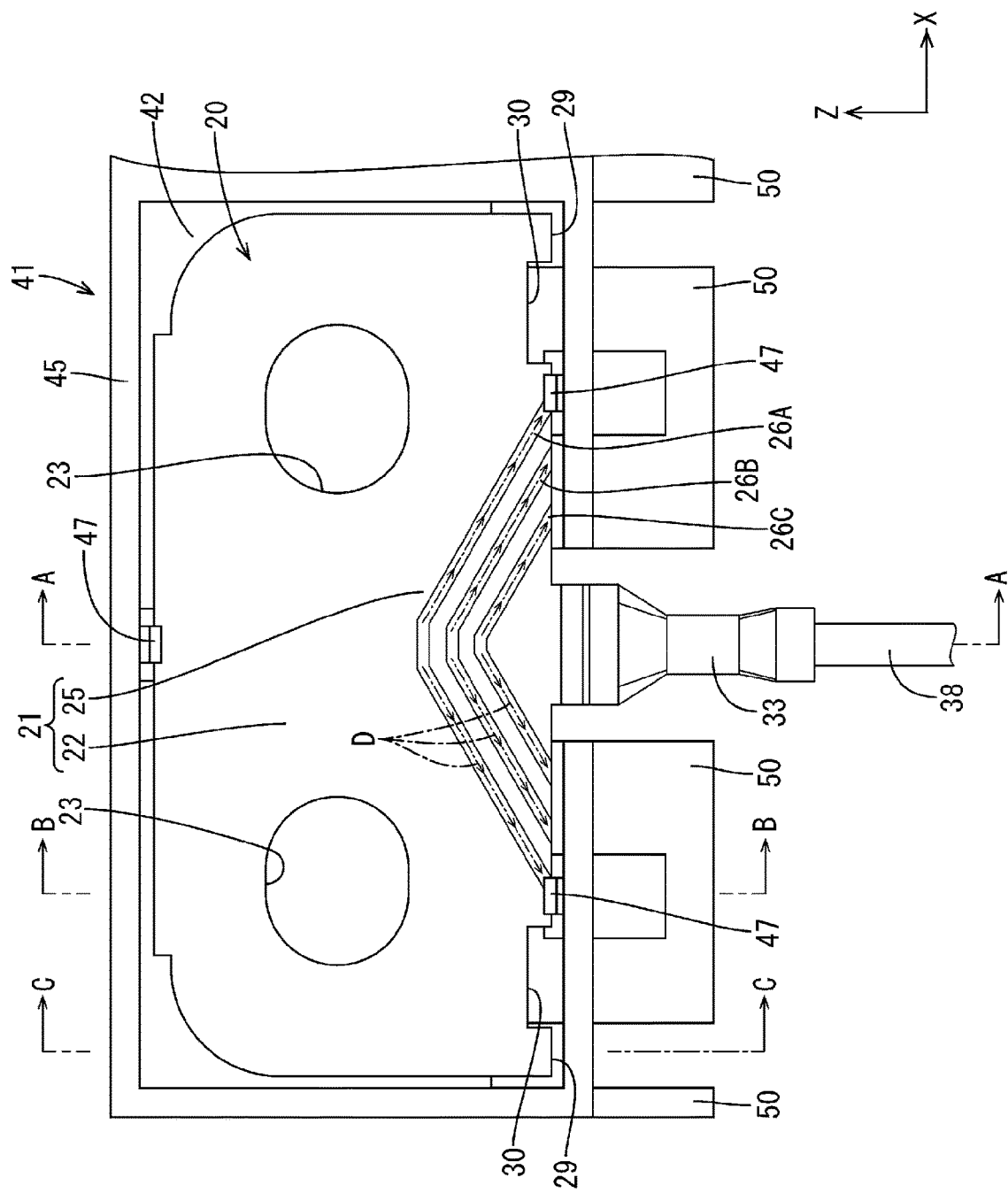
FIG. 3 is a front view of a partial enlargement of the wiring module.
Figure 4:
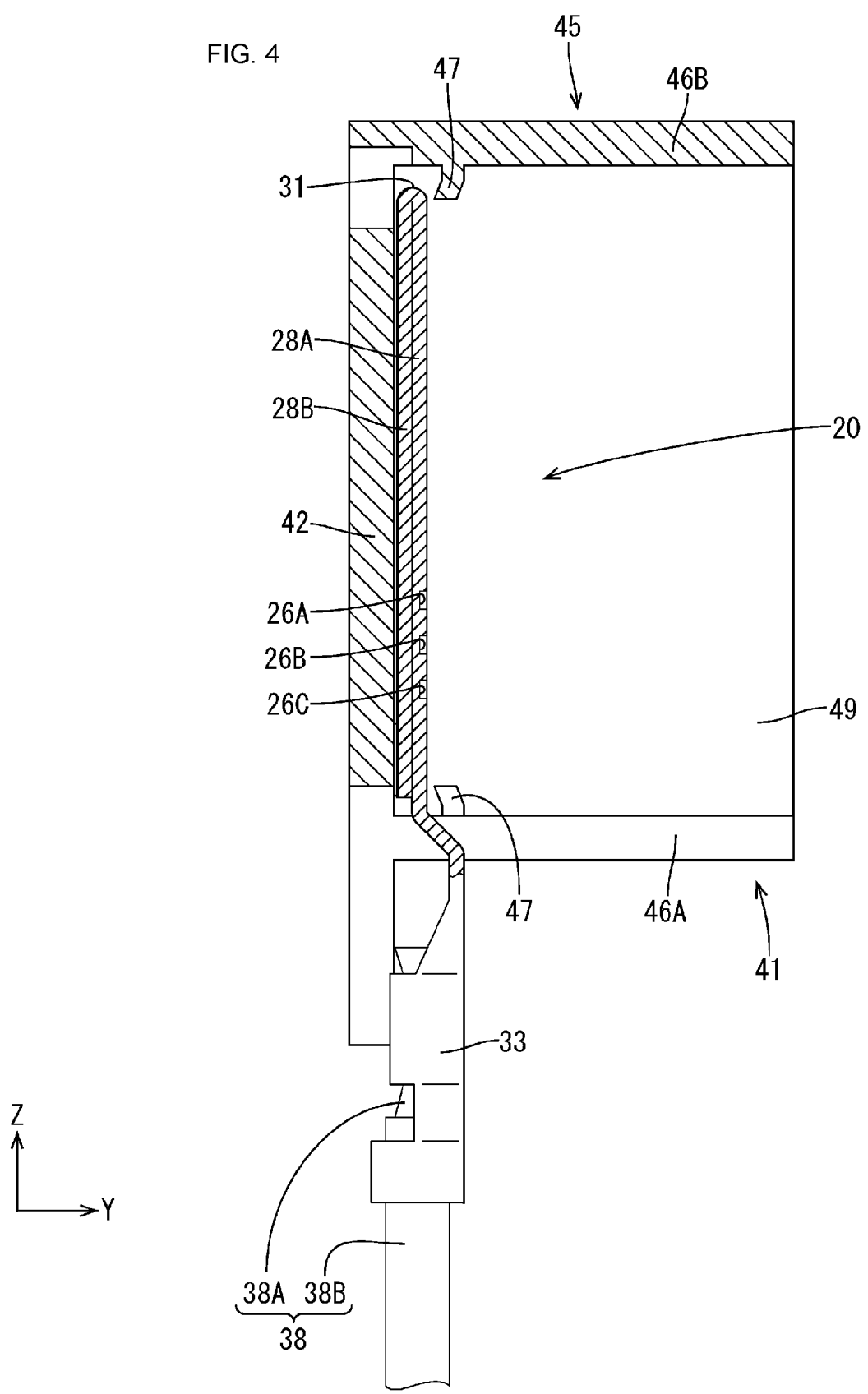
FIG. 4 is a cross-sectional view taken along A-A in FIG. 3.
Figure 5:
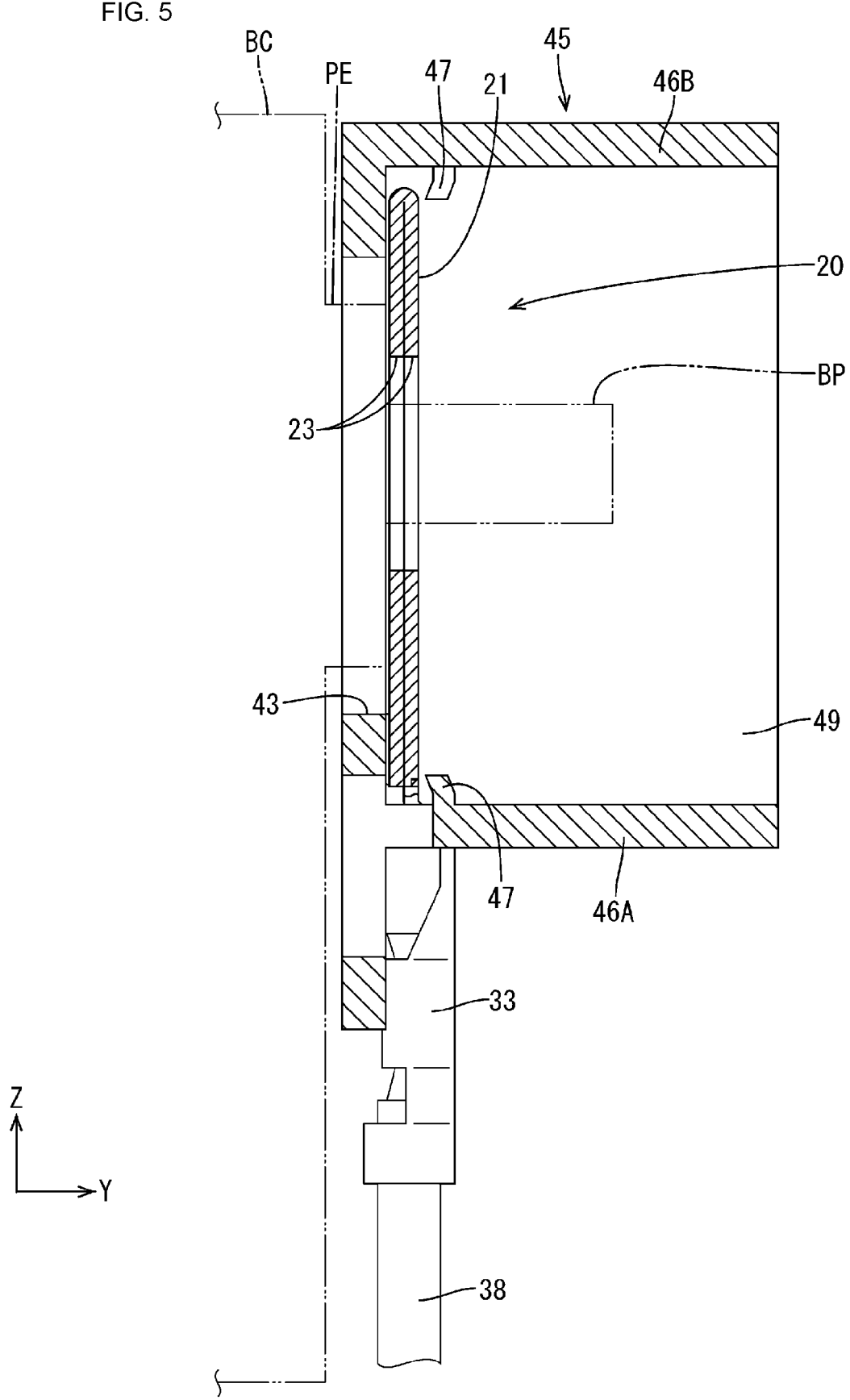
FIG. 5 is a cross-sectional view taken along B-B in FIG. 3.
Figure 6:
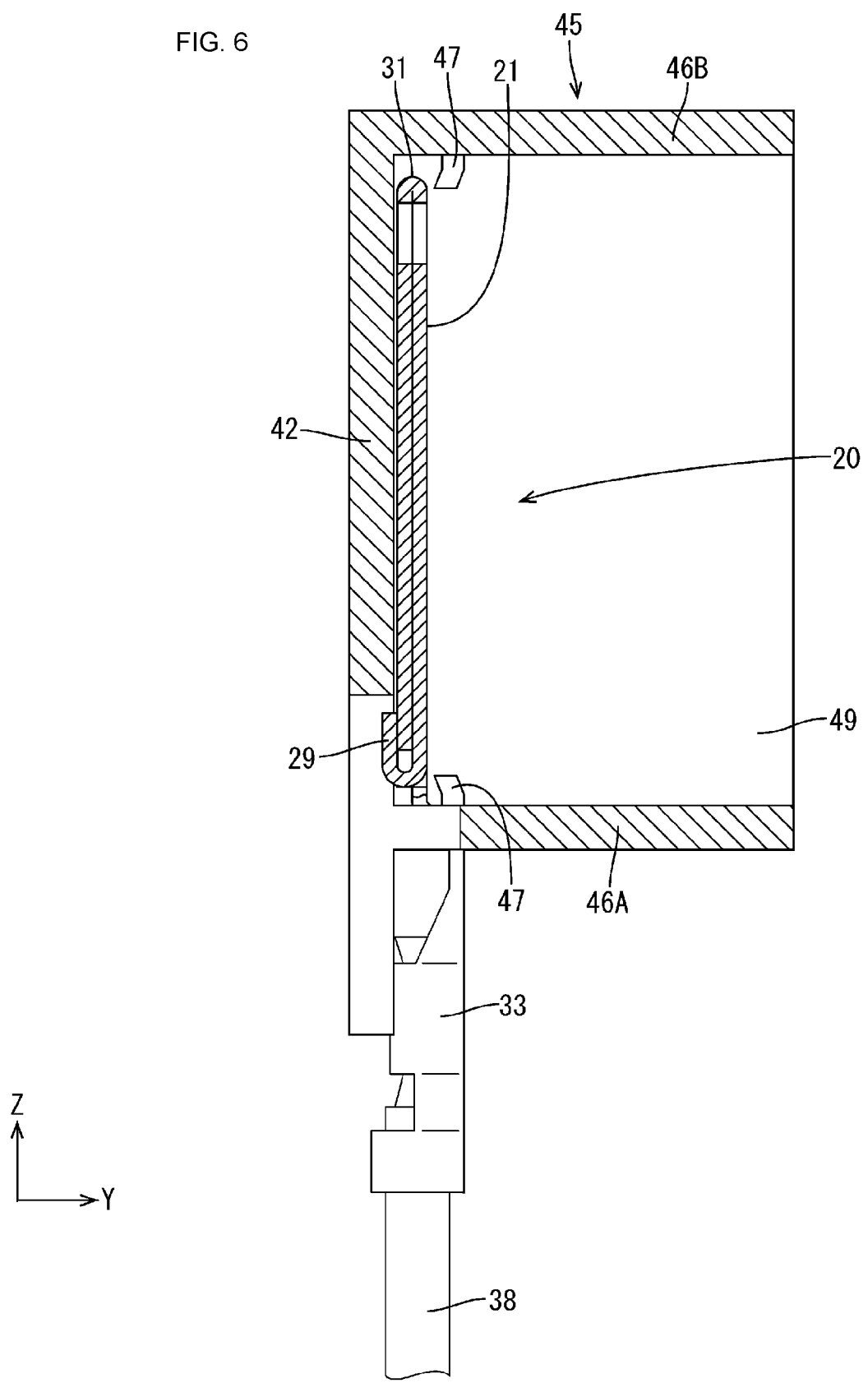
FIG. 6 is a cross-sectional view taken along C-C in FIG. 3.
Figure 7:
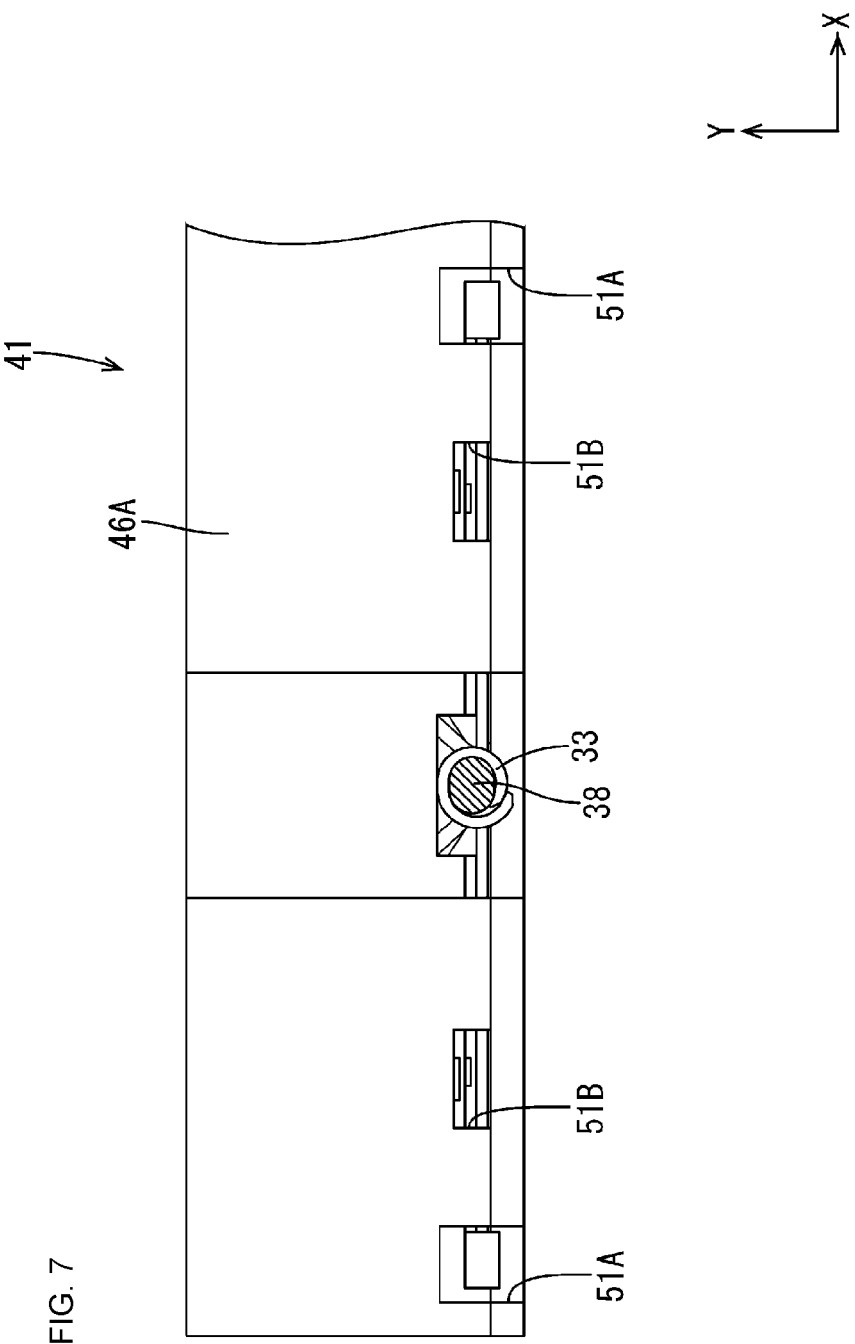
FIG. 7 is a bottom view of a partial enlargement of the wiring module.
Figure 8:
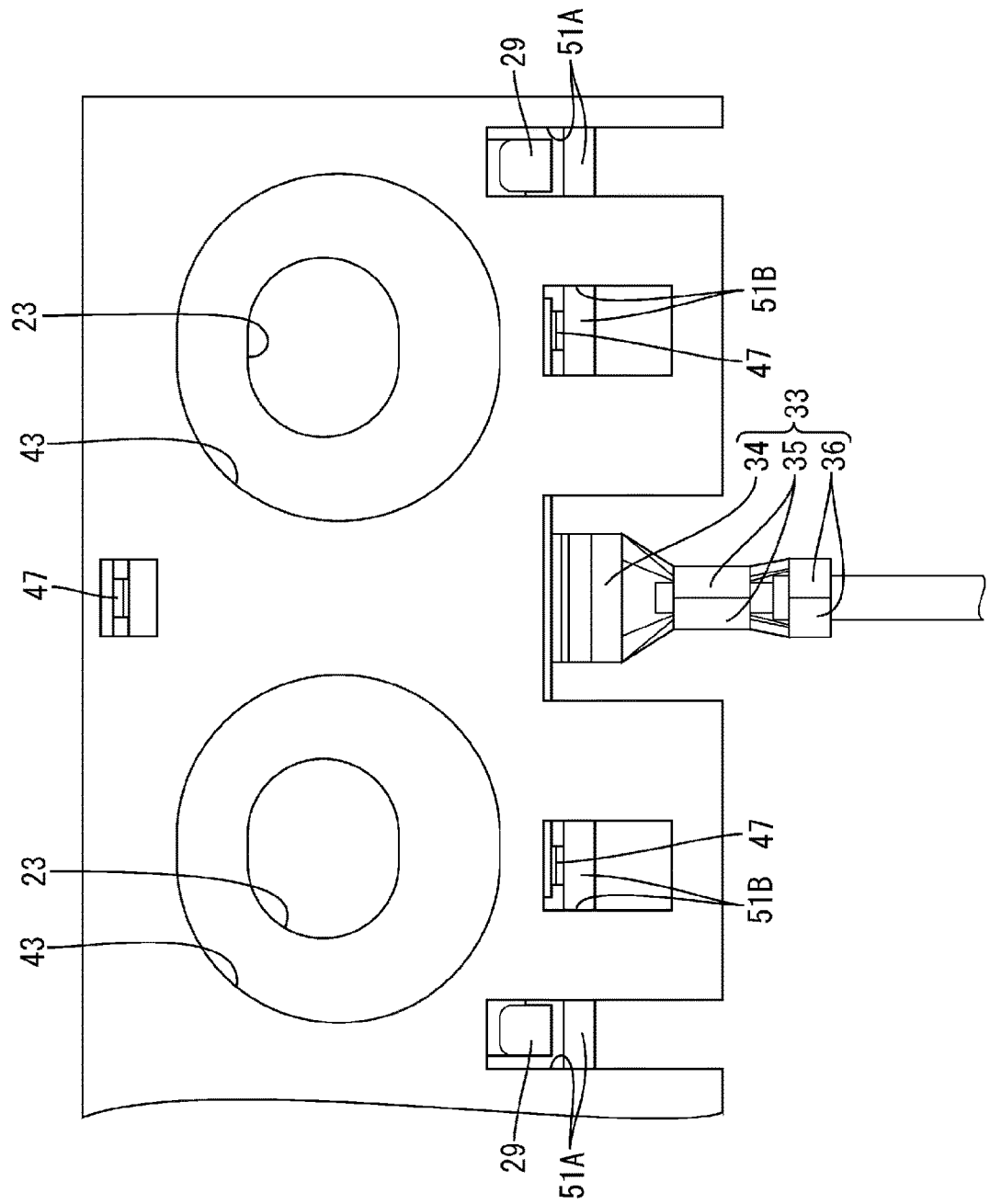
FIG. 8 is a back view of a partial enlargement of the wiring module.

The insulating protector 40 is made of an insulating synthetic resin, and as shown in FIG. 1, includes multiple housing portions 41 that house the bus bar terminals 20. As shown in FIGS. 3 and 4, the housing portions 41 each include a bottom plate portion 42 on which a plate-shaped portion 21 can be placed such that one face (the face on the power storage element BC side) of the plate-shaped portion 21 faces the bottom plate portion 42, and a partition wall 45 that surrounds the plate-shaped portion 21 in a rectangular tube shape. As shown in FIG. 5, a pair of left and right circular opening portions 43 for passage of the electrode terminals BP are formed in the bottom plate portion 42.

Figure 2:
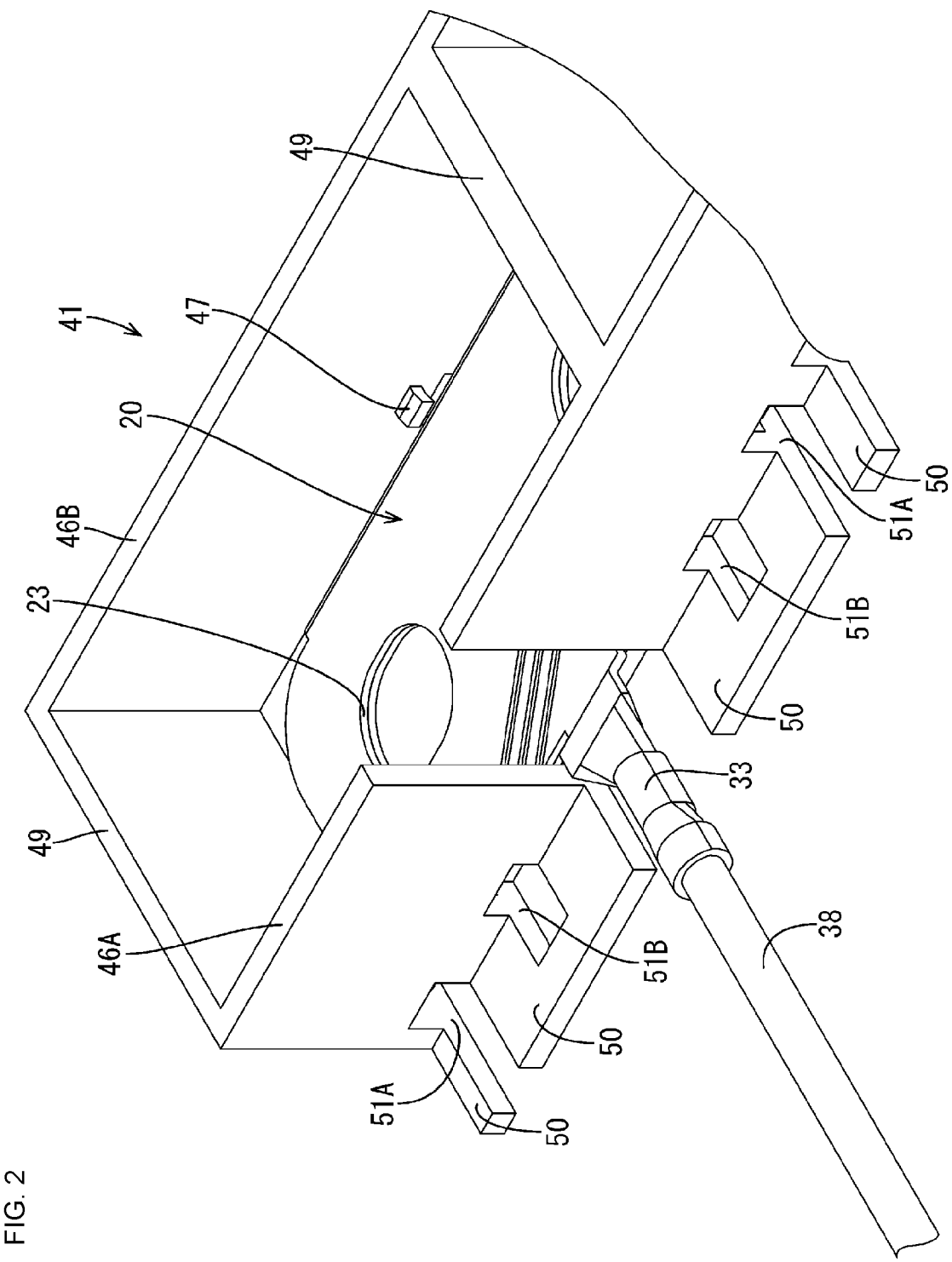
FIG. 2 is a perspective view of a partial enlargement of the wiring module.

As shown in FIG. 2, the partition wall 45 includes a pair of opposing wall portions 46A and 46B that extend along the arrangement direction of the power storage elements BC, and a pair of joining wall portions 49 that join the pair of opposing wall portions 46A and 46B. The opposing wall portions 46A and 46B include multiple withdrawal restriction pieces 47 that restrict withdrawal of the bus bar terminals 20 from the front face side (the side opposite to the power storage element BC). The withdrawal restriction pieces 47 project inward from inward faces of the pair of opposing wall portions 46A and 46B of the partition wall 45, and can be formed with a shape extending in a cantilevered manner and capable of bending deformation by providing cutouts in the bottom plate portion 42 and the partition wall 45. When the withdrawal restriction pieces 47 are bent, and the plate-shaped portion 21 is arranged on the bottom plate portion 42, the withdrawal restriction pieces 47 then undergo restoring deformation, and withdrawal of the bus bar terminal 20 is restricted.

Multiple plate-shaped extension portions 50, which are continuous in the same plane as the bottom plate portion 42, extend outward from the partition wall 45. Multiple discharge holes 51A and 51B that discharge the liquid D (e.g., water) are formed in the housing portion 41 by providing cutouts in the bottom plate portion 42, the opposing wall portions 46A and 46B, and the extension portions 50. The discharge holes 51A and 51B form cuboid spaces. The outward discharge holes 51A are formed so as to extend along the joining wall portion 49, and are formed with a smaller width and larger length than the discharge holes 51B. As shown in FIG. 3, when the liquid D adhered to the electrode connection portion 22 moves to the restriction portions 26A to 26C on the lower side, the liquid D then moves diagonally downward along the restriction portions 26A to 26C, falls from the edge of the plate-shaped portion 21, and is discharged to the outside through the discharge holes 51A and 51B.

The wiring module 10 is formed by housing a bus bar terminal 20 in each of the housing portions 41 (FIG. 1). The wiring module 10 is then attached to multiple power storage elements BC, and nuts are fastened to the electrode terminals BP, thus forming the power storage module. When this power storage module is installed in a vehicle, the wiring module 10 is arranged with the wire connection portion 33 facing downward (the Z direction is the upward direction).

Actions and effects described below are achieved by the present embodiment.

According to the present embodiment, the bus bar terminal 20 is provided with the restriction portions 26A to 26C that are located between the electrode connection portion 22 and the wire connection portion 33 and restrict the movement of the liquid D adhered to the electrode connection portion 22 toward the wire connection portion 33, and therefore the movement of the liquid D from the electrode connection portion 22 toward the wire connection portion 33 is restricted by these restriction portions 26A to 26C. Accordingly, it is possible to suppress the transmission of the liquid D adhered to the bus bar terminal 20 to the electrical wire 38.

The electrode connection portion 22 is provided in the plate-shaped portion 21 that is plate-shaped, and the restriction portions 26A to 26C extend in a continuous manner from the edge of the plate-shaped portion 21 on one lateral side of the wire connection portion 33 to the edge of the plate-shaped portion 21 on the other lateral side.

According to this configuration, the movement of the liquid D toward the electrical wire 38 can be efficiently suppressed with a simple configuration.

Also, the electrode connection portion 22 and the wire connection portion 33 are formed as a single body.

According to this configuration, the number of parts can be reduced compared to the case where the electrode connection portion 22 and the wire connection portion 33 are separate bodies.

Also, the opening portions 43 are formed in the bottom plate portion 42 at positions corresponding to the through-holes 23, and the discharge holes 51A and 51B that discharge the liquid D are formed in at least one of the bottom plate portion 42 and the partition wall 45 at different positions from cutouts for forming the opening portions 43 and the withdrawal restriction pieces 47 (cutouts in the vicinity of the withdrawal restriction pieces 47).

According to this configuration, the liquid D, whose movement toward the electrical wire 38 was restricted by the restriction portions 26A to 26C, can be discharged to the outside.

Second Embodiment

A second embodiment will be described below with reference to FIGS. 12 to 15.

In the second embodiment, a restriction portion 61 of a bus bar terminal 60 is formed with a U shape. Other configurations as the same as those in the first embodiment, and configurations that are the same as in the first embodiment are denoted by the same reference signs, thus omitting redundant descriptions.

Figure 13:
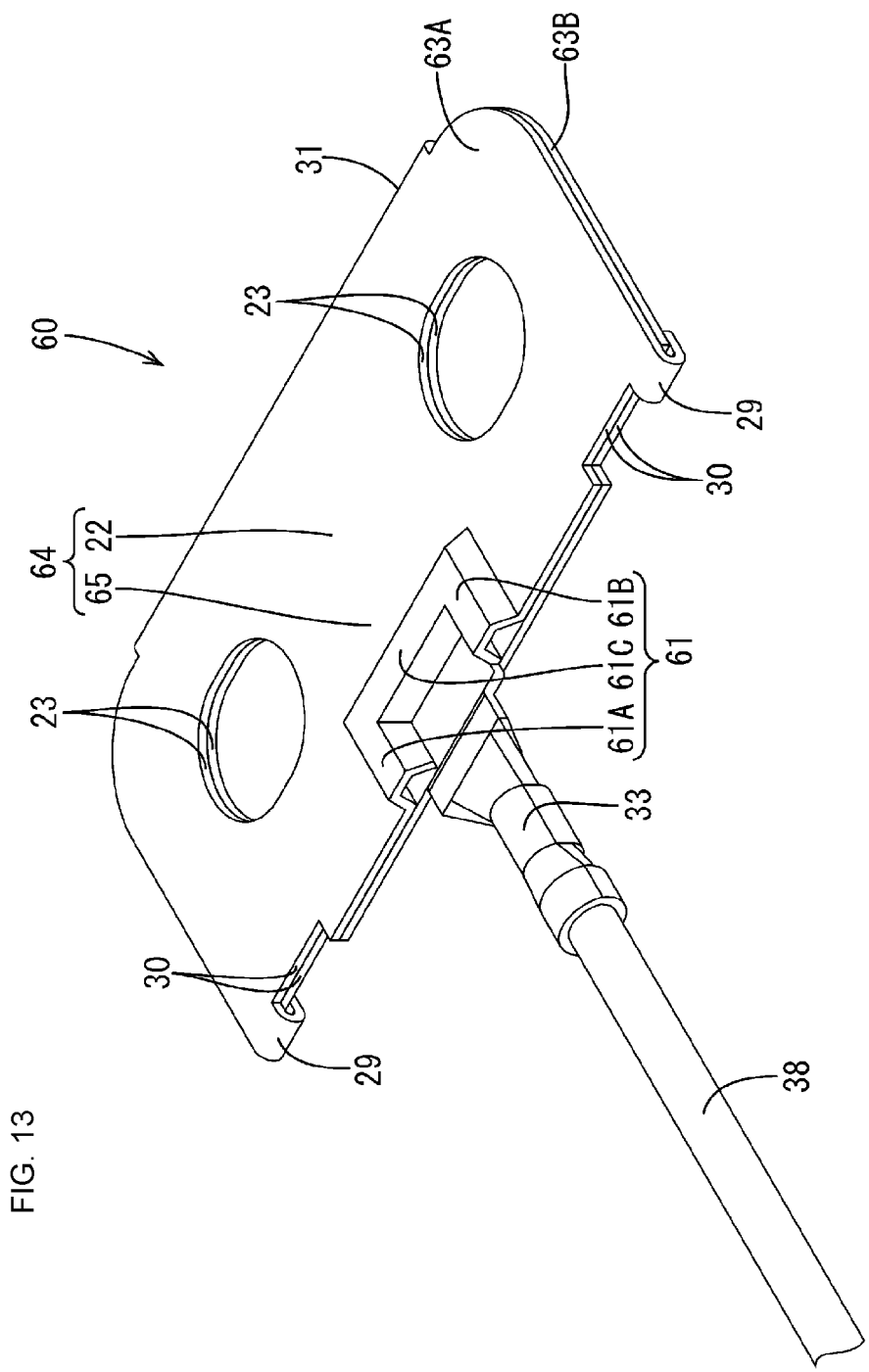
FIG. 13 is a perspective view of a bus bar terminal connected to an end portion of an electrical wire.
Figure 14:
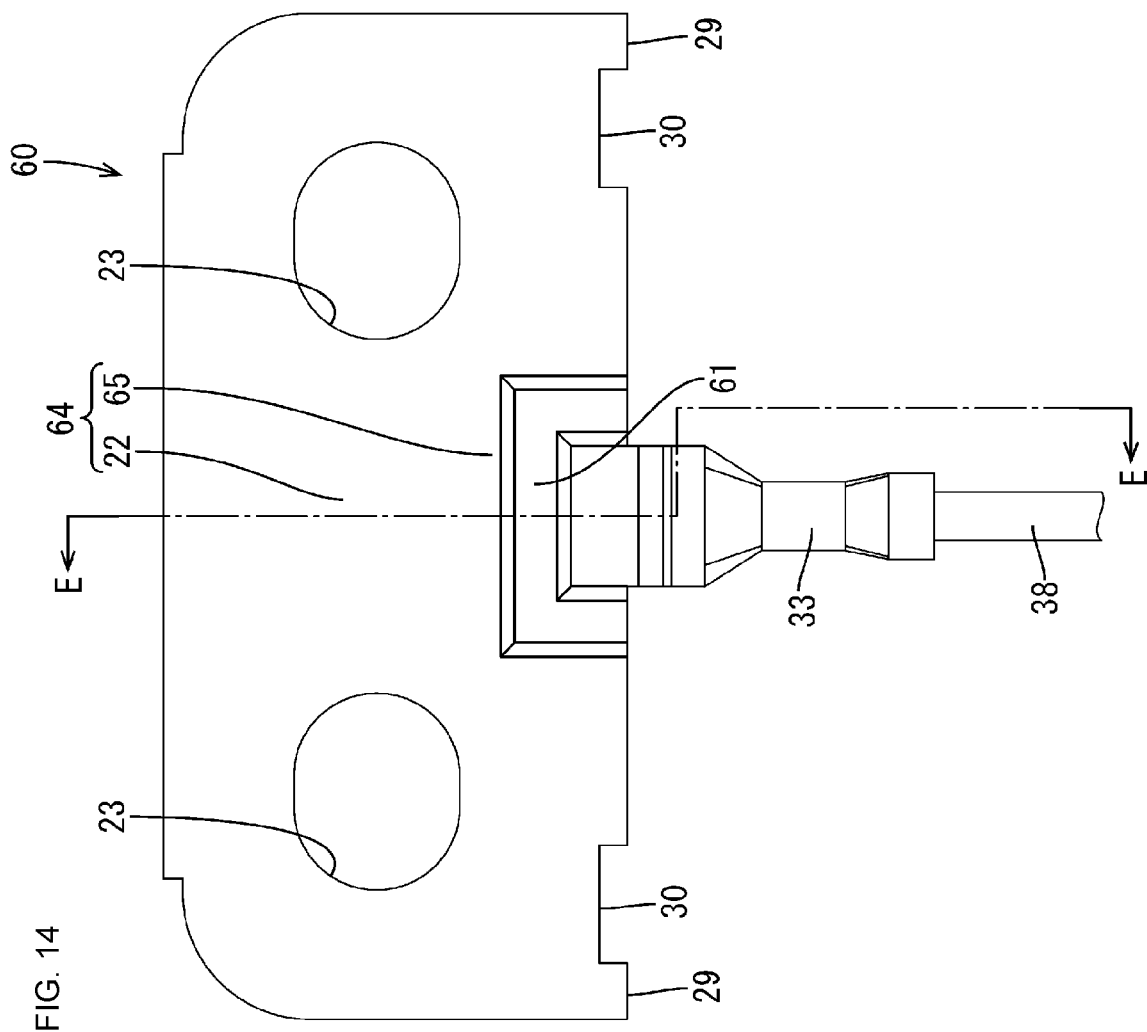
FIG. 14 is a front view of the bus bar terminal connected to the end portion of the electrical wire.
Figure 15:
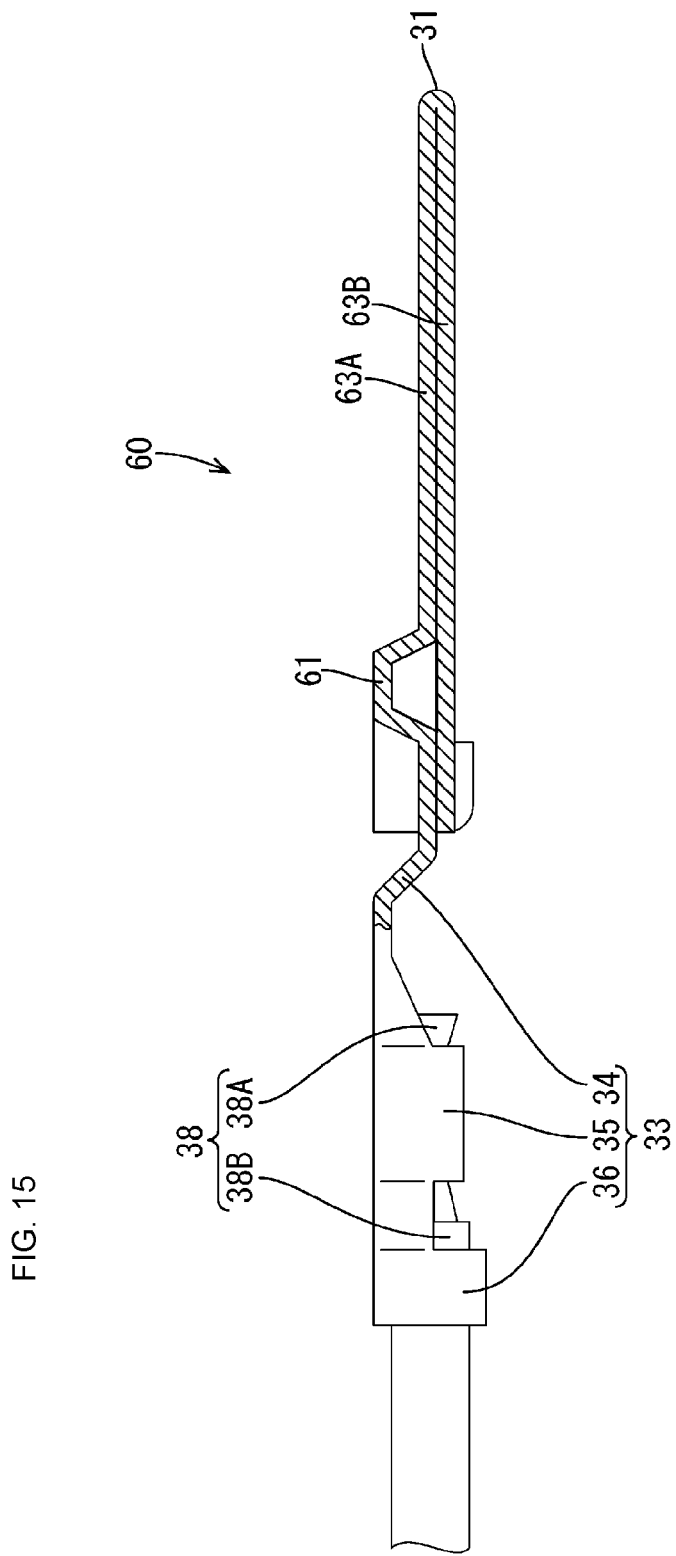
FIG. 15 is a cross-sectional view taken along E-E in FIG. 14.

As shown in FIG. 13, a plate-shaped portion 64 has the electrode connection portion 22 and a joining portion 65, and a restriction portion 61 is formed in the joining portion 65. The restriction portion 61 is obtained by using a pressing device to perform bending processing on the flat plate portion 63A, which is one of flat plate portions 63A and 63B that are rotatably joined by the hinge portion 31, and is formed so as to rise with a mountain shape toward the forward side (the side opposite to the side on which the electrical wire is placed on the bottom plate).

Figure 12:
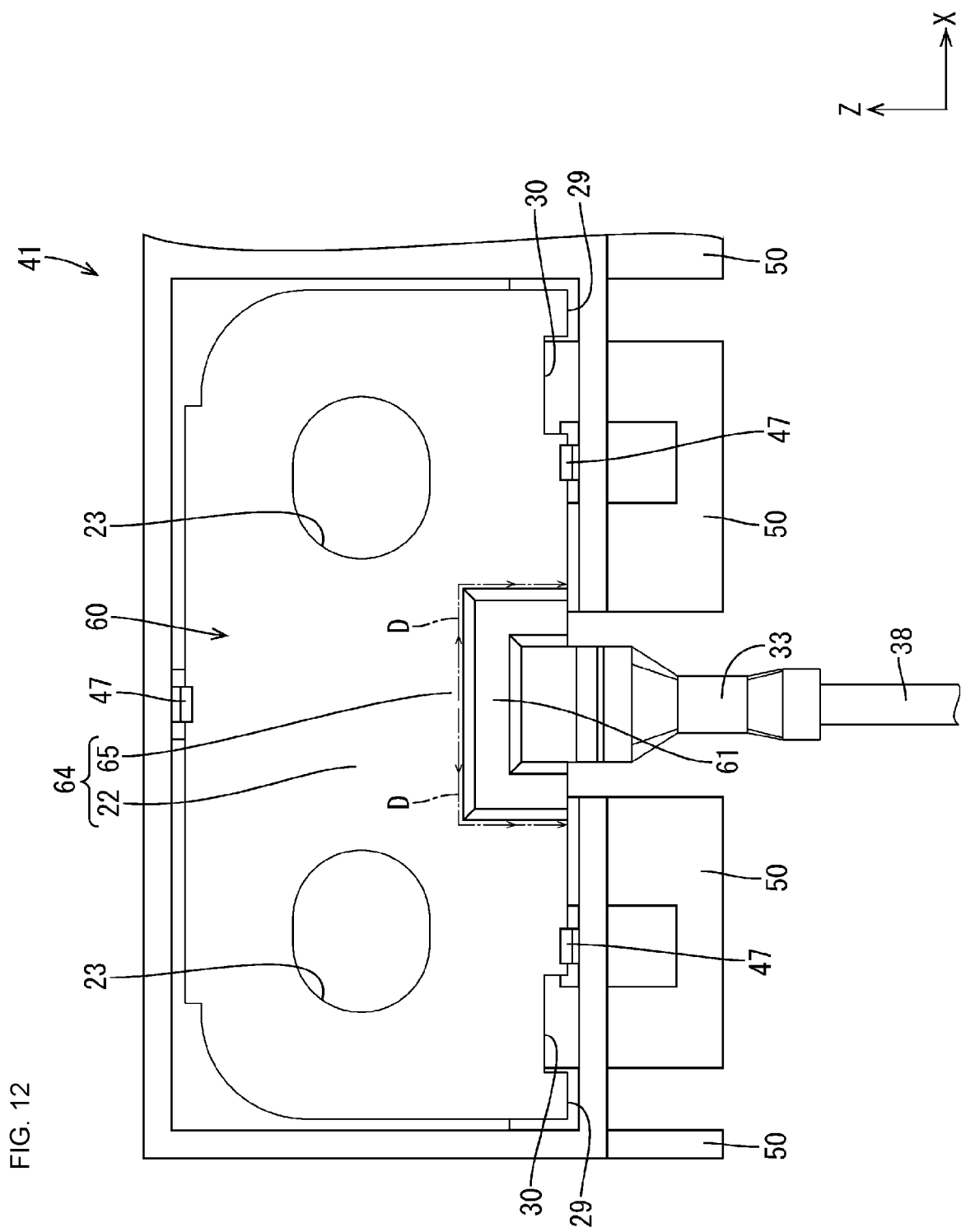
FIG. 12 is a front view of a wiring module of a second embodiment.

The restriction portion 61 includes first restriction walls 61A and 61B that respectively extend from one side and the other side of the wire connection portion 33 in a direction orthogonal to the lower edge of the flat plate portion 63A (plate-shaped portion), and a second restriction wall 61C that joins the first restriction walls 61A and 61B and extends parallel to the lower edge of the flat plate portion 63A. When the liquid D adhered to the electrode connection portion 22 moves from the electrode connection portion 22 toward the restriction portion 61, the liquid D moves along the outer peripheral sides of the restriction portion 61 as shown in FIG. 12, and thus movement of the liquid D toward the wire connection portion 33 is restricted.

Third Embodiment

A third embodiment will be described below with reference to FIGS. 16 to 19.

In a bus bar terminal 70 of the third embodiment, the entirety of a restriction portion 71 is higher than the electrode connection portion 22. Other configurations as the same as those in the above embodiments, and configurations that are the same as in the above embodiments are denoted by the same reference signs, thus omitting redundant descriptions.

Figure 16:
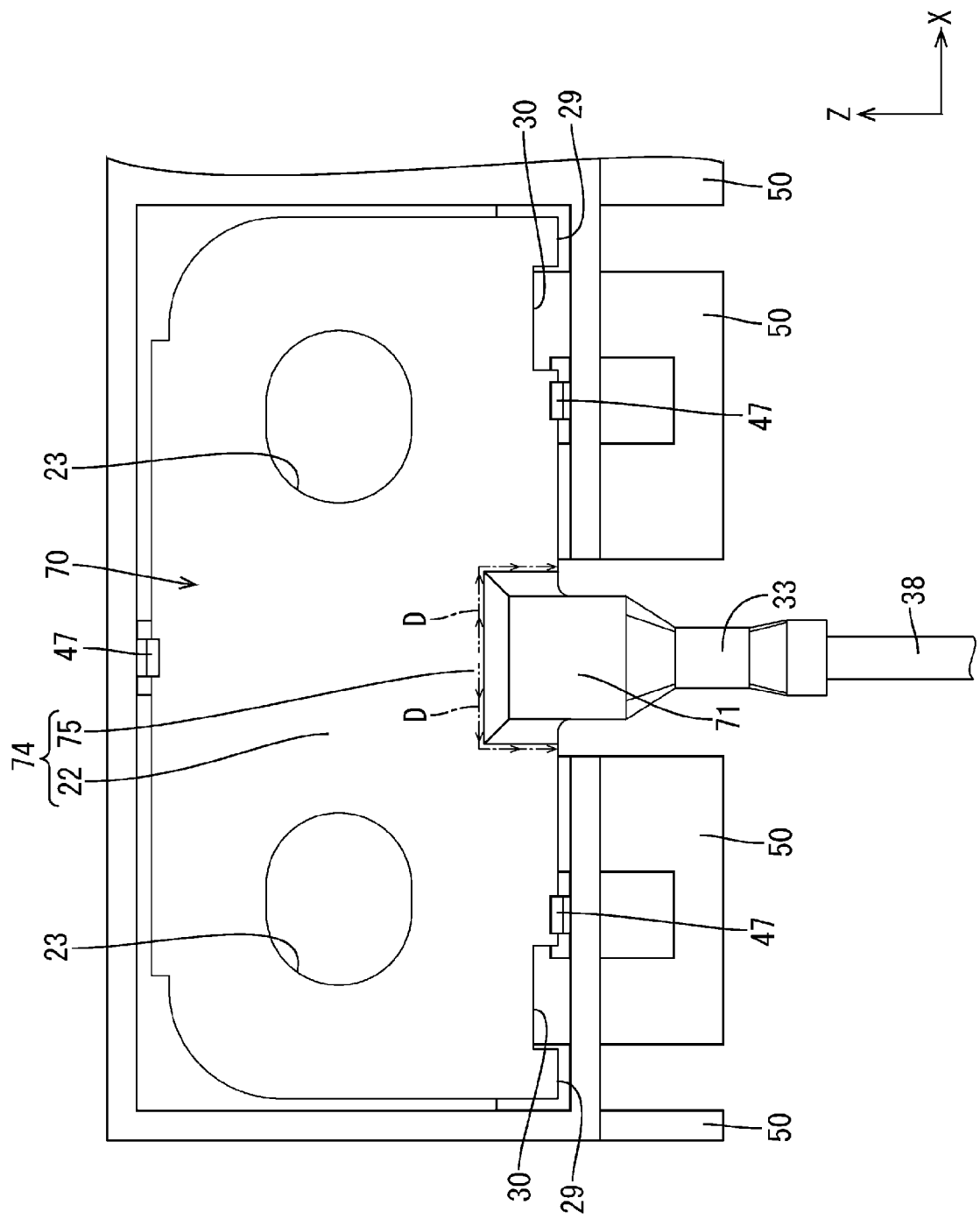
FIG. 16 is a front view of a wiring module of a third embodiment.
Figure 17:
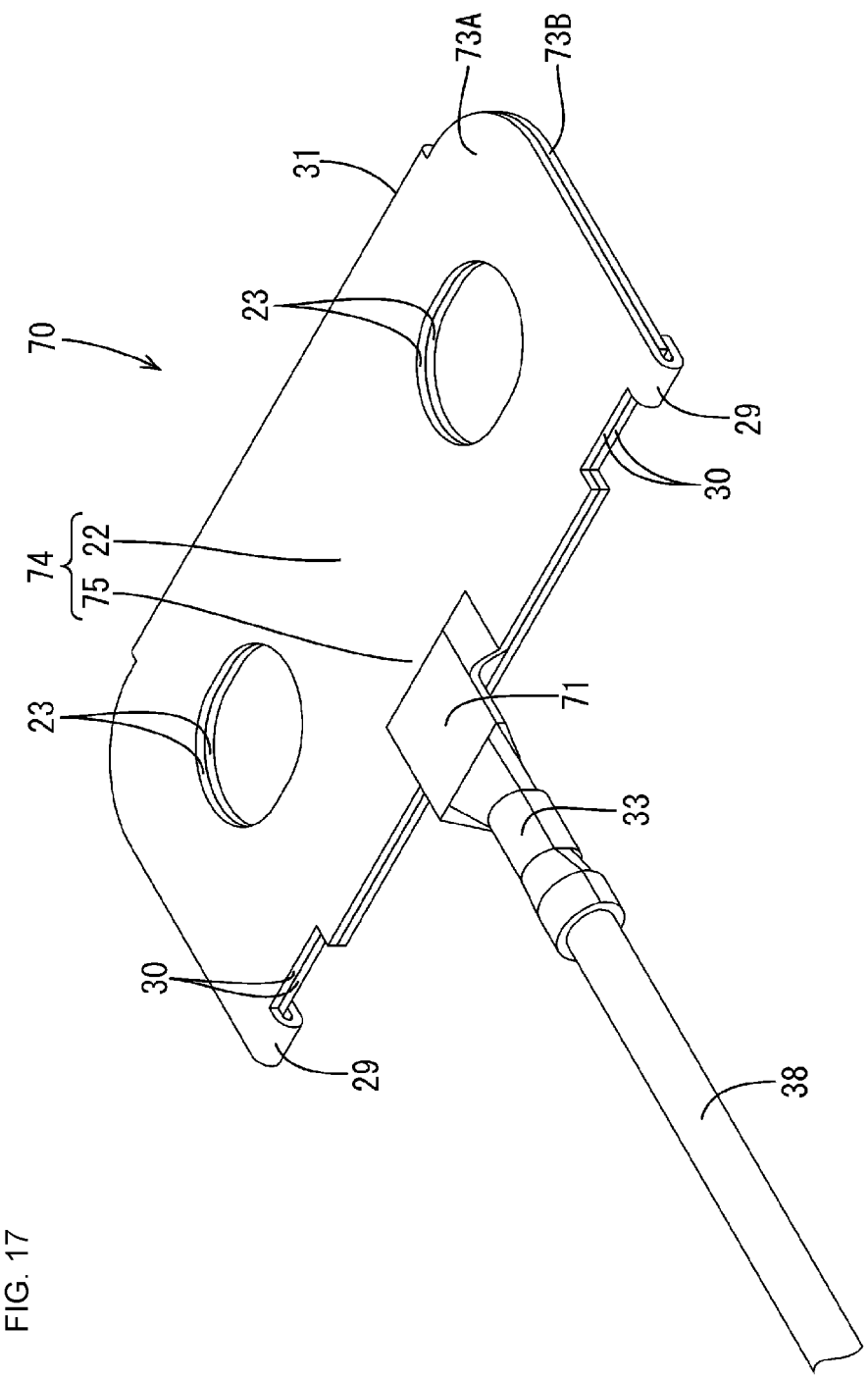
FIG. 17 is a perspective view of a bus bar terminal connected to an end portion of an electrical wire.
Figure 18:
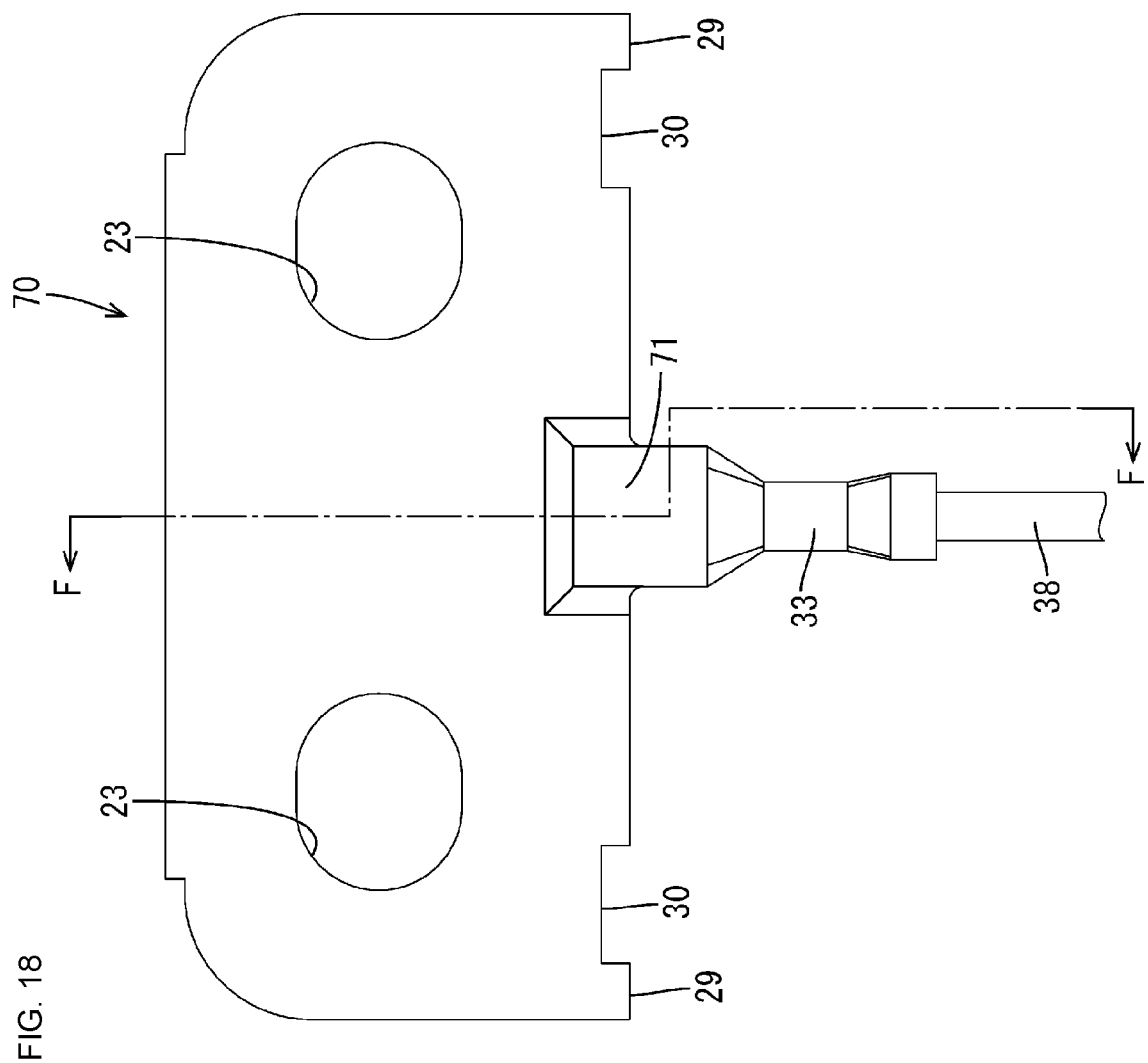
FIG. 18 is a front view of the bus bar terminal connected to the end portion of the electrical wire.
Figure 19:
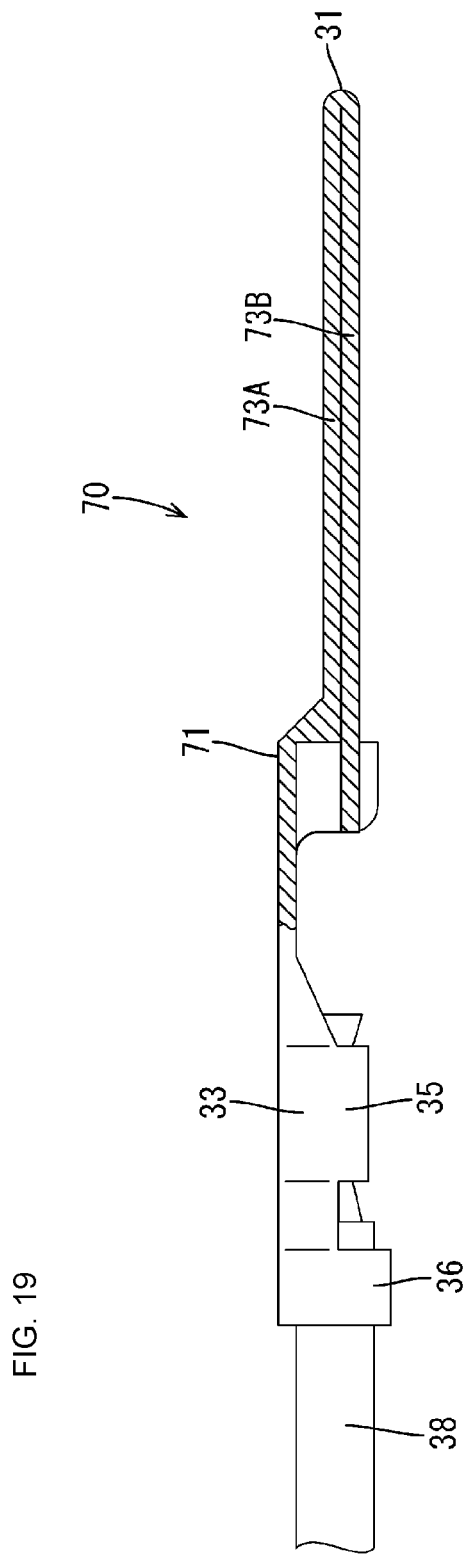
FIG. 19 is a cross-sectional view taken along F-F in FIG. 18.

As shown in FIG. 17, a plate-shaped portion 74 has the electrode connection portion 22 and a joining portion 65, and a restriction portion 71 is formed in the joining portion 65. The restriction portion 71 is obtained by using a pressing device to perform bending processing on a flat plate portion 73A, which is one of flat plate portions 73A and 73B that are rotatably joined by the hinge portion 31, and is formed so as to be higher than the electrode connection portion 22. When the liquid D adhered to the electrode connection portion 22 moves from the electrode connection portion 22 toward the restriction portion 71, the liquid D moves along the outer peripheral sides of the restriction portion 71 as shown in FIG. 16, and thus movement of the liquid D toward the wire connection portion 33 is restricted.

Other Embodiments

The present invention is not intended to be limited to the embodiments described using the above descriptions and drawings, and the technical scope of the present invention also encompasses various embodiments such as the following, for example.

Although the bus bar terminals 20, 60, and 70 are fastened with the electrode terminals BP and nuts in the above embodiments, there is no limitation to this. For example, fastening may be performed by the shaft portion of a bolt serving as a fastening member being inserted through a nut-shaped electrode terminal BP. Also, a configuration is possible in which the through-holes 23 are not provided, and connection with the electrode terminals is performed by laser welding, ultrasonic welding, resistance welding, or the like.

(2) Although the power storage elements BC are cells, there is no limitation this, and they may be capacitors or the like.

The insulating protector 40 may have a configuration in which multiple connection units that are made of an insulating synthetic resin are connected on the left and right sides.

The orientation of the wiring module 10 is not limited to the orientation in the above embodiments, and can be arranged in another orientation. For example, the wiring module may be arranged such that the plate surface of the bus bar terminal is in a horizontal orientation, and in this case as well, the movement of the liquid D toward the wire connection portion 33 can be suppressed by the restriction portions 26A to 26C, 61, and 71.

Although the plate-shaped portions 21, 64, and 74 have a configuration in which two flat plate portions are stacked, there is no limitation this. For example, a plate-shaped portion may be formed from one metal plate member.

Although the liquid D is water in the above description, it may be a liquid other than water.

The positions and shapes of the restriction portions 26A to 26C, 61, and 71 of the bus bar terminal are not limited to the configurations of the above embodiments, and can be changed to different positions and shapes. For example, there is no limitation to a configuration in which the restriction portions are provided at positions on the side corresponding to the discharge holes 51A and 51B of the housing portion 41 as in the above embodiments, and the restriction portions may be provided at positions on the side opposite to the discharge holes 51A and 51B of the housing portion 41.

Although the bus bar terminals 20, 60, and 70 connect adjacent electrode terminals BP, there is no limitation to this, and the terminal may be another terminal. For example, the terminal may be a voltage detection terminal that is connected to an electrode terminal BP. In this case, a configuration is possible in which the terminal is, for example, a voltage detection terminal that is connected to one electrode terminal BP that is not connected to a bus bar for connecting electrode terminals BP to each other (e.g., a electrode terminal BP at an end of serial connection), or a voltage detection terminal that is stacked as a separate body on a bus bar that connects electrode terminals BP to each other.

The invention claimed is:

1. A wiring module comprising:
a terminal having a connection portion, a wire connection portion and a restriction portion, the connection portion is configured to be connected to an electrode terminal of a power storage element; and
the wire connection portion that is to be connected to an electrical wire, and
wherein the restriction portion is provided between the connection portion and the wire connection portion, the restriction portion restricting movement of a liquid adhered to the connection portion toward the wire connection portion; and
an insulating protector that houses the terminal,
wherein the insulating protector comprises a bottom plate portion that opposes a plate surface of the terminal, and a partition wall that rises from the bottom plate portion and partitions off the terminal, and
a discharge hole that discharges the liquid is formed in at least one of the bottom plate portion and the partition wall.

2. The wiring module as set forth in claim 1, wherein the connection portion is provided in a plate-shaped portion that is plate-shaped, and the restriction portion extends in a continuous manner from an edge of the plate-shaped portion on one lateral side of the wire connection portion to an edge of the plate-shaped portion on another lateral side; and
an insulating protector that houses the terminal,
wherein the insulating protector comprises a bottom plate portion that opposes a plate surface of the terminal, and a partition wall that rises from the bottom plate portion and partitions off the terminal, and
a discharge hole that discharges the liquid is formed in at least one of the bottom plate portion and the partition wall.

3. The wiring module wiring module as set forth in claim 1, wherein the electrode terminal is a plurality of the electrode terminals and the connection portion connects the plurality of electrode terminals to each other; and
an insulating protector that houses the terminal,
wherein the insulating protector comprises a bottom plate portion that opposes a plate surface of the terminal, and a partition wall that rises from the bottom plate portion and partitions off the terminal, and
a discharge hole that discharges the liquid is formed in at least one of the bottom plate portion and the partition wall.

* * * * *